July 8, 1958 F. C. HOLMES 2,842,625
ATTENUATOR ARRANGEMENTS
Filed June 14, 1954
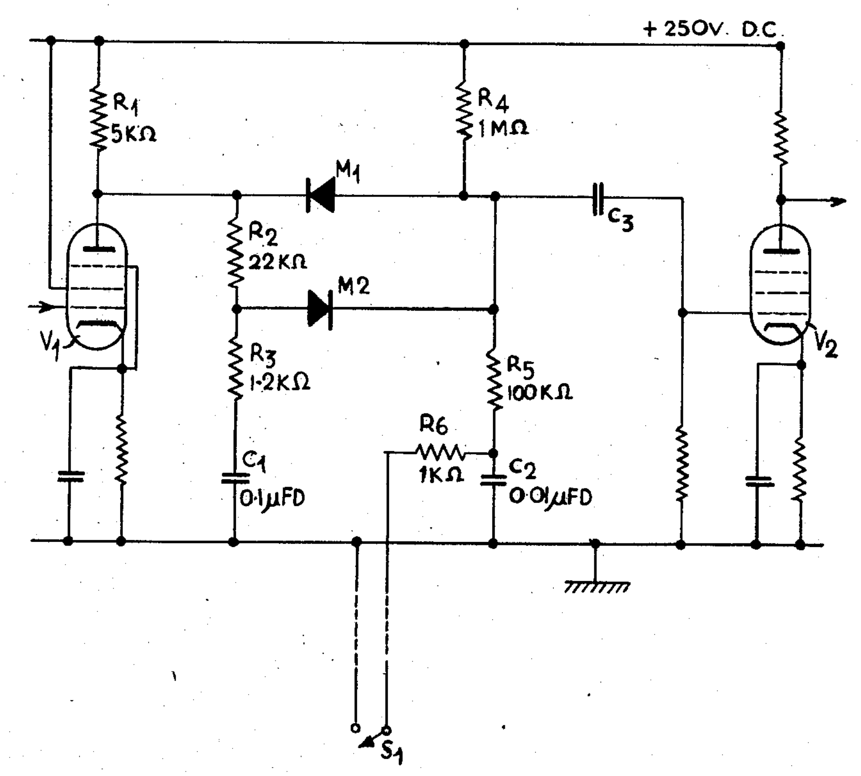
Inventor
FRANK C. HOLMES
By
Holcombe, Wetherill & Brisebois
Attorneys United States Patent Office 2,842,625

Patented July 8, 1958

2,842,625

ATTENUATOR ARRANGEMENTS

Frank C. Holmes, Cambridge, England, assignor to Pye Limited, Cambridge, England, a British company Application June 14, 1954, Serial No. 436,595

Claims priority, application Great Britain June 22, 1953

5 Claims. (Cl. 179—171)

This invention relates to an arrangement for the remote control of the gain of electronic amplifiers, particularly wide-band amplifiers.

It is sometimes required to attenuate the gain of an amplifier in steps under conditions where the attenuating switch or control is most conveniently situated at a point remote from the amplifier chassis. This is particularly the case when groups of matched amplifiers consisting of a number of wide-band amplifiers are required to be step-attenuated simultaneously, and difficulty is encountered in the ganging of the switch spindles of the attenuators associated with each amplifier.

The present invention consists in an arrangement for the remote control of the gain of an electronic amplifier, wherein the amplifier includes a rectifying device associated with an attenuator network, and having switch means for switching said rectifying device either to a conducting state or a non-conducting state, whereby in one state of said rectifying device the signal is passed substantially without attenuation and in the other state of said rectifying device the signal is attenuated according to the characteristic of the attenuator network. The rectifying device may comprise a thermionic diode, but preferably a crystal diode such as a germanium crystal diode is employed.

By the terms "rectifying device" or "rectifier" as used throughout this specification and claims is meant a substantially unidirectional conductivity device.

In a preferred form of the invention two rectifying devices are provided associated with the attenuator network. The arrangement is such that when one rectifying device is conducting to pass an applied signal without substantial attenuation, the other rectifying device is non-conducting, and the operation of the switch means applies a potential to the first rectifying device to render it non-conducting, and to the second rectifying device to render it conducting, whereby the signal passes through the second rectifying device and the attenuator network and is thereby attenuated according to the characteristic of the network.

In order that the invention may be more fully understood, one embodiment thereof will now be described with reference to the accompanying drawing.

In the drawing V1 is an amplifier valve, having an anode load resistor R1. The valve V1 is connected in parallel with a network comprising resistor R2, resistor R3 and condenser C1 connected in series. The anode of valve V1 is also connected to one pole of a rectifier M1 which has its other pole connected to the high tension positive line through a resistor R4. A second rectifier M2 is also connected, with reverse polarity to rectifier M1, between the junction of resistors R2, R3, and the junction of rectifier M1 and resistor R4. From the latter point a condenser C3 feeds the signal to the grid of the valve V2, and to this point is also connected one end of resistor R5 connected in series with condenser C2 to the high tension negative line. Switch S1 connected in series with resistor R6 is joined between the high tension negative line and the junction of condenser C2 and resistor R5.

The output signal from V1 may be passed to V2 either directly through rectifier M1 and condenser C3 or through resistor R2, the second rectifier M2 and condenser C3. In the former case the signal is substantially unattenuated and in the latter case, the signal is attenuated by the ratio R2+R3:R3.

Switching of the circuit to alter the attenuation is carried out by means of the switch S1, which alters the potential at the junction of the two rectifiers M1 and M2 with resistors R4 and R5 by earthing the lower end of R5 through resistor R6. The resistor R6 is fitted for the purpose of quenching any sparking at the switch S1 due to the discharge of the decoupling condenser C2. The switch S1 may be located at a remote point if desired.

When the switch S1 is open, D. C. current will flow through rectifier M1, via resistance R4, from the positive H. T. line to the point of lower potential at V1 anode. Under this condition rectifier M1 offers only approximately 150 ohms impedance to any output from V1 which is thus passed to the grid of valve V2 substantially unattenuated. When switch S1 is closed, the potential at the junction of R4 and R5 will be lowered to a value below that of the anode of V1 and rectifier M1 no longer conducts, and presents an impedance to the output signal from valve V1 of the order of 1 megohm. However, due to the lowering of the potential at the junction of resistors R4, R5, D. C. current will now flow through rectifier M2 via resistor R2 allowing the video signal to pass to the grid of valve V2.

The component values are dictated by a consideration of frequency response and voltage handling requirements. The values indicated have been used for 100 kc./s. band width at about one volt peak level for an attenuation of 24 db.

Whilst a particular embodiment has been described, it will be understood that various modifications may be made without departing from the scope of this invention.

I claim:

1. An attenuator circuit comprising an input terminal, an output terminal, an attenuator network connected to said input terminal, a first rectifying device having an anode and a cathode, a second rectifying device having an anode and a cathode, means connecting the cathode of said first rectifying device and the anode of said second rectifying device to different points on said attenuator network, means connecting the anode of said first rectifying device and the cathode of said second rectifying device together, a source of positive potential, means for feeding a positive potential from said source to the connected electrodes of said first and second rectifying devices, switch means connected between the connected electrodes of said first and second rectifying devices and a point of fixed potential, and means connecting the connected electrodes of said first and second rectifying devices to the output terminal.

2. An attenuator circuit comprising an input terminal, an output terminal, an attenuator network consisting of two resistors and a condenser connected in series between said input terminal and a point of fixed potential, a first rectifying device having an anode and a cathode, a second rectifying device having an anode and a cathode, means connecting the cathode of said first rectifying device to said input terminal, means connecting the anode of said second rectifying device to the junction point of said two resistors, means connecting the anode of said first rectifying device and the cathode of said second rectifying device together, a source of positive potential, means for feeding a positive potential from said source to the connected electrodes of said first and second rectifying devices, switch means connected between the connected electrodes of said first and second rectifying devices and said point of fixed potential, and means connecting the connected electrodes of said first and second rectifying devices to the output terminal.

3. An attenuator circuit comprising an input terminal, an output terminal, an attenuator network consisting of a chain of resistors and condensers connected between said input terminal and a point of fixed potential, a first rectifying device, a second rectifying device, means connecting one electrode of said first rectifying device to said input terminal, means connecting the electrode of opposite polarity of said second rectifying device to an intermediate point on said attenuator network, means connecting the other electrodes of said first and second rectifying devices together, a source of potential, means for feeding a potential from said source to the connected electrodes of said first and second rectifying devices, switch means connected between the connected electrodes of said first and second rectifying devices and said point of fixed potential, and means connecting the connected electrodes of said first and second rectifying devices to the output terminal.

4. An attenuator circuit comprising a first amplifier stage, a second amplifier stage, an attenuator network connected to the output of said first amplifier stage, a first rectifying device, a second rectifying device, means connecting one electrode of said first rectifying device to the output of said first amplifier stage, means connecting the electrode of opposite polarity of said second rectifying device to an intermediate point on said attenuator network, means connecting the other electrodes of said first and second rectifying devices together, a source of potential, means for feeding a potential from said source to the connected electrodes of said first and second rectifying devices, switch means connected between the connected electrodes of said first and second rectifying devices and a point of fixed potential, and means connecting the connected electrodes of said first and second rectifying devices to the input of the second amplifier stage.

5. An attenuator circuit comprising a first amplifier stage, a second amplifier stage, an attenuator network consisting of a chain of resistors and a condenser connected in series between the output of said first amplifier stage and a point of fixed potentials, a first rectifying device having an anode and a cathode, a second rectifying device having an anode and a cathode, means connecting the cathode of said first rectifying device to the output of said first amplifier stage, means connecting the anode of said second rectifying device to an intermediate point on said attenuator network, means connecting the anode of said first rectifying device and the cathode of said second rectifying device together, a source of positive potential, a resistor connected between said source of positive potential and the connected electrodes of said first and second rectifying devices, a switch connected between the connected electrodes of said first and second rectifying devices and said point of fixed potential, and means connecting the connected electrodes of said first and second rectifying devices to the input of the second amplifier stage.

References Cited in the file of this patent

UNITED STATES PATENTS

| | | |
|---|---|---|
| 2,543,797 | Page | Mar. 6, 1951 |
| 2,580,052 | Torre et al. | Dec. 25, 1951 |
| 2,735,902 | Vose | Feb. 21, 1956 |
| 2,743,324 | Gregory et al. | Apr. 24, 1956 |